United States Patent [19]
Reichman

[11] 3,975,835
[45] Aug. 24, 1976

[54] COMPUTER APPLICATIONS TRAINER

[75] Inventor: Ronald Reichman, College Park, Md.

[73] Assignee: The Singer Company, New York, N.Y.

[22] Filed: Feb. 19, 1975

[21] Appl. No.: 551,168

[52] U.S. Cl. .................................... 35/13; 35/9 C; 35/30
[51] Int. Cl.² ........................................ G09B 25/02
[58] Field of Search ............... 35/7 R, 7 A, 8 R, 9 R, 35/9 C, 9 D, 10, 13, 19 R, 19 A, 30, 31 R, 31 C, 35 D, 53, 54, 66, 6; 40/132 D, 142 A, 130 L; 235/184, 156; 273/1 E; 340/147

[56] References Cited
UNITED STATES PATENTS

| | | | |
|---|---|---|---|
| 3,352,031 | 11/1967 | Lindquist | 35/30 |
| 3,614,404 | 10/1971 | Garfein | 235/159 |
| 3,640,002 | 2/1972 | Braillard et al. | 35/8 R |
| 3,660,913 | 5/1972 | Heath | 35/30 |
| 3,680,228 | 8/1972 | Chamecki | 35/30 |
| 3,681,859 | 8/1972 | Sandovaz et al. | 35/30 |
| 3,688,416 | 9/1972 | Koenig et al. | 35/31 R |
| 3,707,783 | 1/1973 | Hajduk | 35/31 R |
| 3,787,988 | 1/1974 | Nakajima et al. | 35/31 R |

Primary Examiner—Anton O. Oechsle
Assistant Examiner—Vance Y. Hum
Attorney, Agent, or Firm—Ronald Reichman; James C. Kesterson

[57] ABSTRACT

The invention of this disclosure comprises a system of visually displaying digital information and various digital computer functions. The apparatus of this invention is a training and display device which comprises: a plurality of switches and a plurality of terminals which are mounted to a sheet, a multiplicity of registers which are connected to the switches and terminals, a multiplicity of adders which are connected to the registers, a plurality of light bulbs which are connected to the registers and mounted on the surface of the sheet, a power supply, and apparatus for selectively lighting the light bulbs to display various numerical and computer functions. Hence specific computer operations may be simulated, and what information is stored in that particular portion of memory may be displayed to a trainee.

7 Claims, 6 Drawing Figures

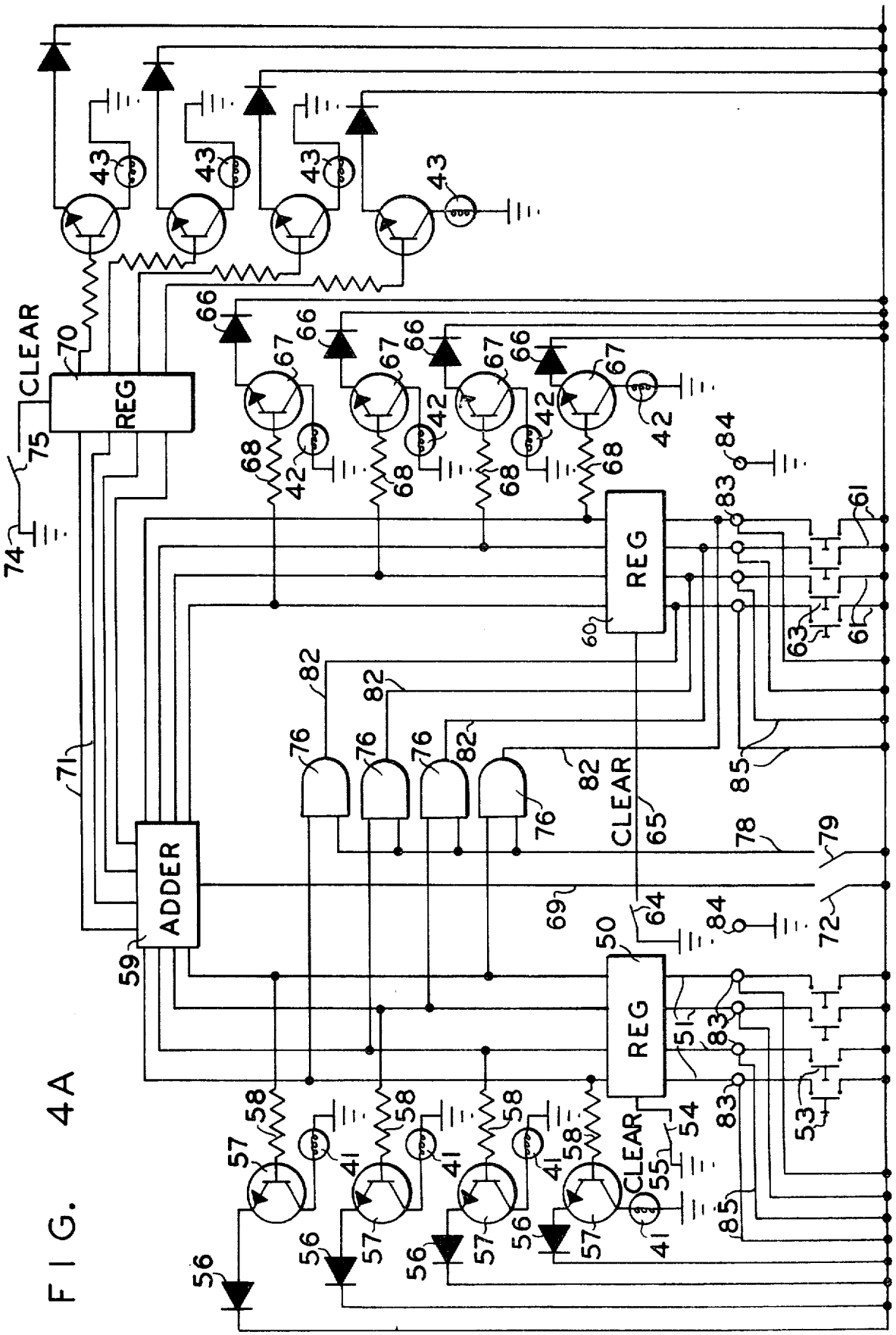
F I G. 4A

COMPUTER APPLICATIONS TRAINER

CROSS REFERENCE TO RELATED APPLICATION

The subject matter of this invention is an improvement to the subject matter of copending U.S. patent application Ser. No. 534,231 filed Jan. 17, 1975, in the name of Curtis S. Arnall and entitled Programming Applications Trainer.

FIELD OF THE INVENTION

This invention relates to training and display devices and more particularly to electronic devices which display information in coded form.

DESCRIPTION OF THE PRIOR ART

Since computers record and collate information about our lives from the time we are born to the grave, many people have often stated that the period of time we are not living in can be called the "Age of Computers." This dependency on computers has necessitated training a large percentage of our population the concepts of computer science.

A digital computer derives its great capability from being able to perform many very simple operations in rapid succession. It is essential that the sequence of operations be performed automatically since manual control of the sequential operations would make calculations prohibitively long. Thus the computer's high speed of operation makes it extremely difficult to demonstrate the steps that a computer performs to solve a particular problem. Furthermore computers are usually expensive devices and maintained in specially designed areas where facilities for instructing groups of people are not usually available. Therefore the fundamentals of computer science are not usually taught with the aid of a computer.

The concepts of digital information, binary addition, binary multiplication, machine language, transferring information from one computer register to another computer register, etc., are not easily understood when described verbally. Since a computer would not be a satisfactory device for teaching the concepts of the aforementioned subjects, some other visual device is usually employed. The visual devices available usually employ some surface which can be written on so that the information one wants to display appears on said surface. Surfaces on which one usually writes to convey information are blackboards, charts, paper pads, visual image projectors, etc. Someone wishing to display various forms of information upon a blackboard would have to draw each illustration at the same time he is trying to explain the concept of the illustration. The instructor may be precluded from writing the material he wishes to convey to the class upon the blackboard before the class arrives, since enough blackboard space might not exist for the material he wishes to describe to the students. Also, an extensive amount of written material on a blackboard would tend to distract the students, preventing the student from listening to the instructor, and gaining the full meaning and implication of the subject matter being described.

If an instructor wanted to demonstrate to an instructional group, work accomplished during the course of an instructional period, or at home by the students or trainees of that group, considerable time would be expended to display the students' efforts on a blackboard or similar writing surface.

SUMMARY OF THE INVENTION

This invention overcomes the disadvantages of the prior art by providing means for the instantaneous display of coded information upon a surface. Thus, the instructor can have the material he planned to teach the class prepared before the lesson, and expend his time actually instructing the class rather than copying extensive material on a blackboard. Also, the work done by a student in class or at home may readily be displayed. Information is stored in a computer's memory in some coded form, and the presence of an event is usually indicated by information stored in a computer memory such as by the presence of a magnetic field in some ferrite cores. This information would not be visible to a student. It would, therefore, be useful to a student's understanding and comprehension of the subject matter, to represent the occurrence of an event, or the presence of a certain digit by having a light turn on, so that the student can see what information is stored in memory. A student's comprehension of the subject matter would be increased if the Instructor could simulate some computer functions.

The main parts of a digital computer are: an input device for entering information; a memory unit for storing information, an arithmetic and logic unit for performing computations, and a control unit for causing the computer to proceed through the problem by executing the proper operations.

This invention simulates some of the parts of a digital computer. Information may be entered into a portion of the apparatus of this invention by a person operating switches, or by placing an information-conduction plate on the apparatus of this invention's data entry terminals. Registers store the information that was entered. Information that is stored in registers are displayed by means of light bulbs, which may be considered output devices. Adders are used to perform computations; the answers to the computations performed by the adders are displayed by means of light bulbs. The person operating this invention may be considered the control unit, for the reason that the operator must cause the apparatus of this invention to perform the proper operations in the proper sequential order, in order to solve the desired problem.

It is an object of this invention to provide a new and improved electrical display system.

It is another object of this invention to provide a new and improved electrical system for displaying binary numbers and computer coded information to an instructional group.

It is a further object of this invention to provide a new and improved training device for displaying numbers in any suitable radix, addition, multiplication, machine language, programmed information and computer coded information to a class.

Other objects and advantages of this invention will become apparent as the following description proceeds, which description should be considered together with the accompanying drawings.

BRIEF DESCRIPTION OF THE DRAWINGS

FIGS. 4A and 4B are sections of a logic diagram of the electrical system which comprises a part of this invention.

DETAILED DESCRIPTION OF A PREFERRED EMBODIMENT

Figure 1:
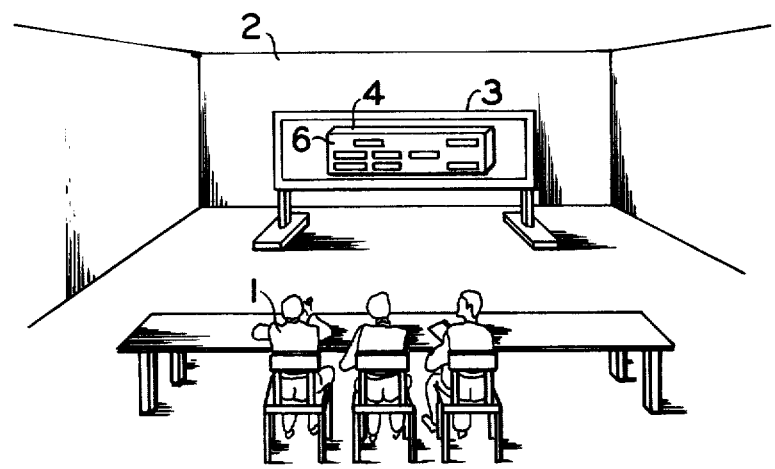
FIG. 1 is a diagram of a classroom in which the apparatus of this invention may be used.

Referring now to the drawings in detail, and more particularly to FIG. 1, the reference character 1 represents a group of students who are sitting in a classroom 2. The apparatus of this invention 4 is placed in an upright position in the front of classroom 2 so that the students can see the front surface 6 of apparatus 4. A student's ability to comprehend subject matter which is orally described is enhanced if more than the student's sense of hearing perceives the concepts being taught. The apparatus of this invention can increase a student's ability to comprehend the subject matter being taught. For the reason that information which the instructor wants to display, transfter, add or multiply will automatically appear in the form of images upon the front surface 6 of apparatus 4, when the proper switches hereinafter described are closed and or information-conduction plates hereinafter described are correctly positioned on the front surface of apparatus 3. Thus the student will hear, and possibly write the subject matter being taught. Alphanumeric characters may be written on the information-conduction plate and the front surface 6 of apparatus 4 to describe the images. Hence, apparatus 4 may be used as a teaching device to simulate various computer functions.

It is possible to place apparatus 4 in an upright position in many different ways. One possible method of placing apparatus 4 in an upright position is to place the bottom surface of apparatus 4 in the ledge used to held chalk of blackboard 3; the top surface of apparatus 4 will then lean against the blackboard.

Figure 2:
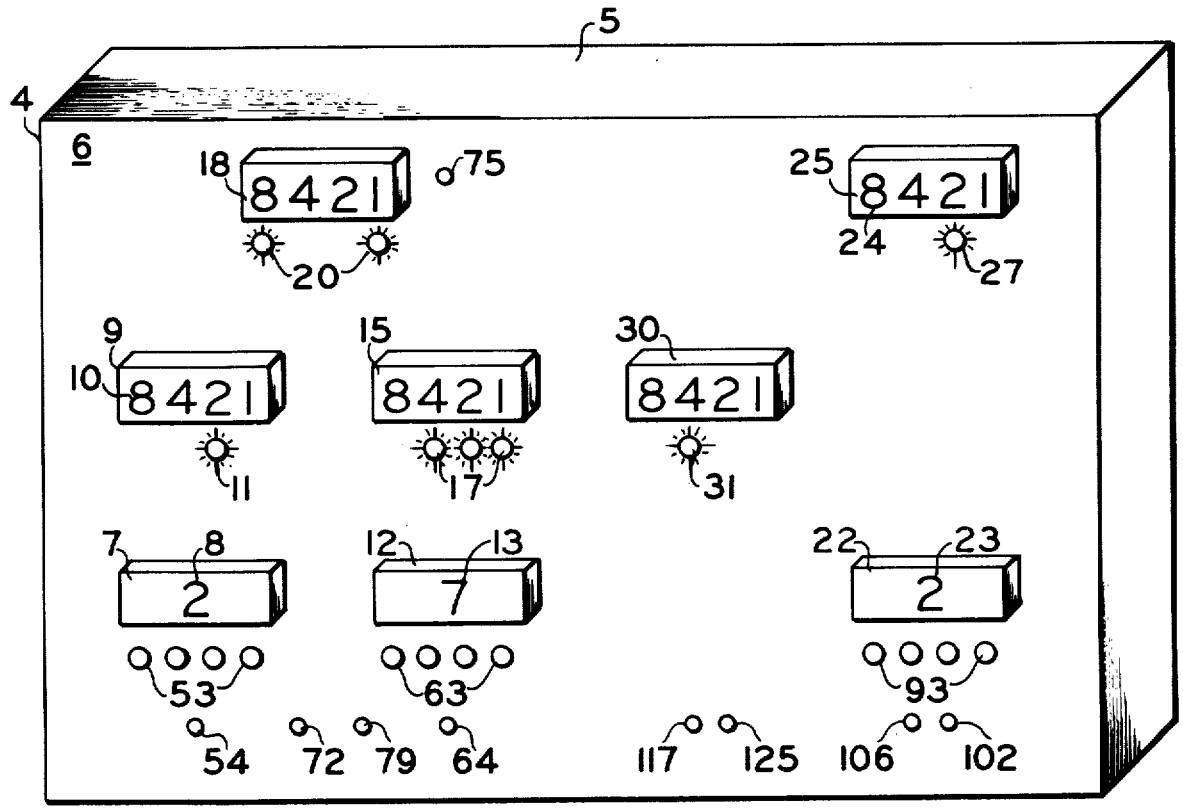
FIG. 2 is a front view of one form of apparatus incorporating this invention.
Figure 3:
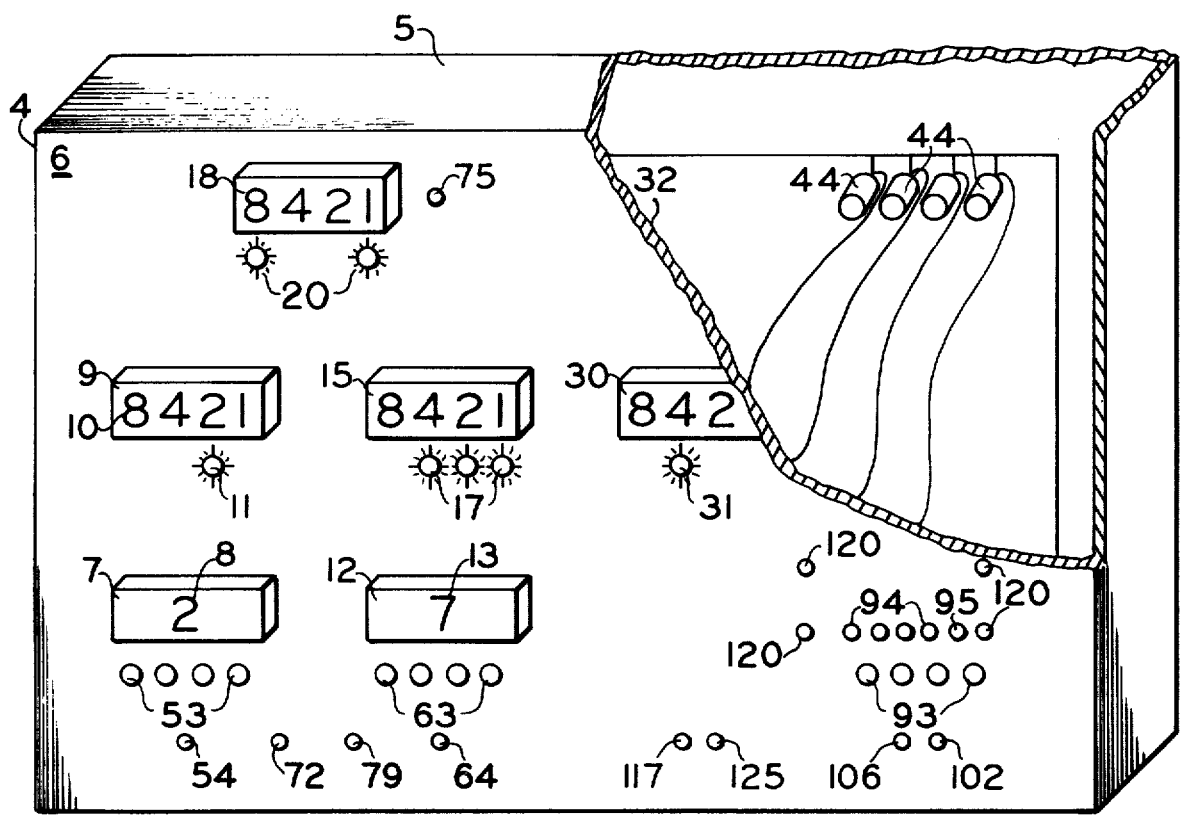
FIG. 3 is a perspective view partially in section, of one form of this invention.

As shown in FIGS. 2 and 3 apparatus 4 comprises: a housing having side surfaces 5 made of any rigid material; and a front surface comprising a transparent or translucent sheet 6 so that when a plurality of light bulbs 44 mounted to the back surface 32 behind sheet 6 below plate 25 are energized, a plurality of illuminated images 27 will appear upon the surface of sheet 6. One image appears upon the surface of sheet 6 for each light bulb that is lit. Plate 25 may be mounted on sheet 6 in any conventional manner, such as by having a magnet affixed to sheet 6, and having a ferro-magnetic material mounted on plate 25. A plurality of numbers 24 are marked on plate 25 in any known manner such as by painting, carving, writing with a grease pencil, etc. Each number appearing on plate 25 is positioned so that it is above one of the images 27 which may appear on sheet 6. Thus, various numerical values may be given by the instructor to each image, because plate 25 is capable of being easily placed onto or removed from sheet 6.

Plates 9, 15, 30, and 18 are similar to plate 25 and are affixed to sheet 6 in the same manner as plate 25. When the respective plurality of illuminating devices mounted behind sheet 6 and below plates 9, 15, 30, and 18 are selectively energized, a plurality of images, 11, 17, 31, and 20 will respectively appear on sheet 6. A plurality of numbers 10 are written on plate 9 in any conventional manner. In the same manner as numerical information was written on plate 9, numerical information is written on plates 15, 30, and 18. Whenever an instructor desires, he may remove any of the aforementioned plates and either replace the plates with new plates or place different numerical information upon the plates.

Written information 8 which the instructor wants to demonstrate to the class is contained on an information-conduction plate 7. The written information is marked in alphanumeric characters, or in any other suitable form on one face of plate 7 so that the written information is visible to the class, and the same information is encoded in electrical conductors on the other face of plate 7. When plate 7 is correctly positioned on sheet 6, images 11 will automatically appear on sheet 6. As shown in FIGS. 2 and 3 the number 2 in binary will be visually demonstrated to the class by images 11. The binary bits that would be present in binary number 2 would be represented by the images 11. Images 11 will be clearly visible so that a student in the back of classroom 2 would see images 11 more clearly than material which would be written on a blackboard.

Information-conduction plates 12 and 22 are similar to plate 7. The information 23 that is affixed to plate 22 is visually demonstrated by images 27. Images 17 represent the value of the information 13 written on plate 12. Images 20 represent the addition of the numerical information 8, and 13. Whenever an instructor desires he may remove any or all of the information-conduction plates, and replace them with a new plate or encode different information on the original plate.

As shown in FIG. 3 when plate 22 is removed, a plurality of electrical terminals 94 protrude from sheet 6, and the exposed electrical contact 95 protrudes from sheet 6 the same distance as terminals 94. Magnets 120 are mounted on sheet 6 in any conventional manner, and are so positioned that they will hold the plate 22 (shown in FIG. 5) in electrical contact with selected terminals 94 and contact 95 causing images 27 to appear on sheet 6.

Characters 53, 63, and 93 represent a plurality of switches by which information may also be entered into the apparatus of this invention. Thus images 11 may represent the information entered by switches 53; images 17 may represent the information entered by switches 63; and images 26 may represent the information entered by switches 93.

Characters 54, 64, 75, 102, 117, and 125 respectively represent a plurality of switches, which when depressed clear the contents of registers which hold the information displayed by images 11, 17, 20, 24, and 31 respectively. Thus when all of the above switches are depressed, no illuminated images will appear upon the surface of sheet 6.

When switch 79 is closed images 11 will disappear from the surface of sheet 6, and images 17 will automatically appear upon the surface of sheet 6. The information displayed by images 11 are stored in one register and the information displayed by images 17 are stored in another register. Thus by closing switch 79, an instructor can visually demonstrate to a class the transmission of information from one register to another register. The design and operation of the electronic circuit used to accomplish the transfer of information from one register to another register is described in FIG. 4a.

By depressing switch 72 the information displayed by images 11, is automatically added to the information displayed by images 17. As shown in FIGS. 2 and 3 the addition of the numerical values 2 and 7 will be displayed by images 20 as the binary equivalent of the number 9 to the base 10.

If the instructor so desires he may demonstrate to a class how a computer would solve a multiplication problem. The number 2 to the base 10 in binary form is entered into the apparatus by means of this invention by means of plate 22 or switches 93. As shown in FIG. 2 images 27 represent the multiplicand, and the number of times switch 106 is depressed would represent the multiplier. In the example shown in FIG. 2 switch 106 was depressed two times, hence image 31 represents the binary notation of the number 4 to the base 10.

As can be visualized from the above, an instructor may demonstrate and display to a class the different steps a computer takes to solve a particular problem.

Figure 4B:
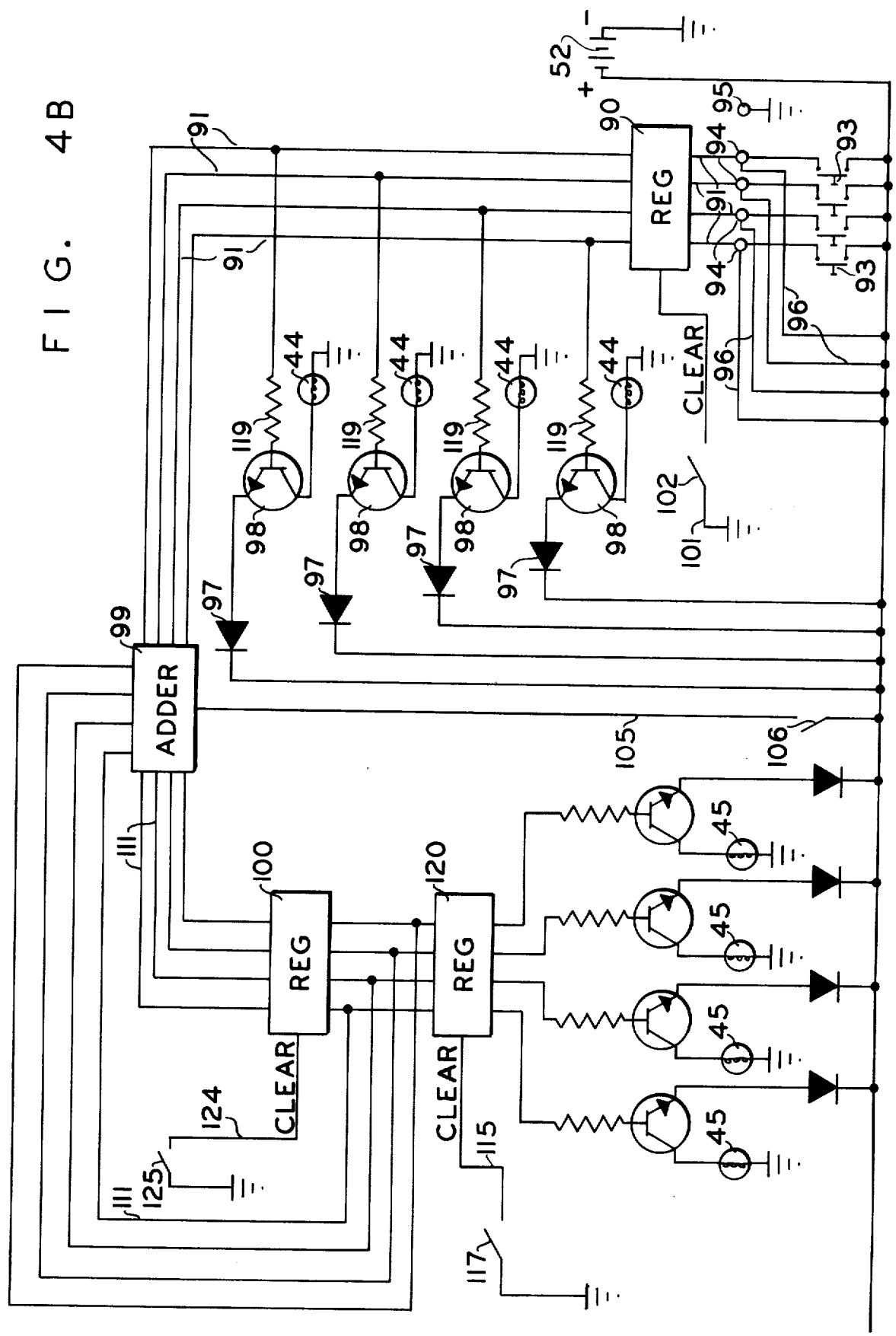

FIGS. 4A and 4B, taken together, show an over-all block and schematic circuit diagram of a computer display trainer incorporating the principles of the present invention. Reference character 50 designates a register of the type commonly used in electronic digital computers. The inputs of register 50 are a plurality of wires 51 which are connected to register 50 in parallel. Said plurality of wires 51 carry digital information in the form of electrical impulses. Digital information comprising one binary digit will be transmitted by each of said wires 51. Thus, if one wanted to construct a 32 bit computer display trainer, he would connect wires to register 50 in parallel. Wires 51 are connected to the positive terminal of a source of electrical power, such as battery 52 (FIG. 4B). A plurality of switches 53 are individually connected to the wires 51. Thus, for each switch 53 which is closed, there will be a positive pulse representing a one for that particular digit going to the input of register 50. A switch 54 is connected in series to wire 55, wire 55 being connected to register 50 and to the ground. When switch 54 is closed, a negative clear pulse will be transmitted to the input of register 50, causing the output of register 50 to be cleared to all zeros.

It would be advantageous for demonstration and teaching purposes for a student to know what information is stored in register 50. A method for indicating the presence of a positive pulse on one of the wires 51 is to cause a light bulb to be illuminated when the positive pulse is present. The utilization of light bulbs on display panels for indicating the contents of various registers are old in the art. One method disclosed by the prior are for causing light bulbs to be illuminated is described in U.S. Pat. No. 3,694,808 to William Booth. Thus, a light bulb 41 may be energized by battery 52 through a diode 56 and the emitter-collector circuit of a transistor 57. The base electrode of the transistor 57 is connected through a limiting resistor 58 to wire 51. In the aforementioned manner said plurality of light bulbs 41 are coupled to wires 51, each light bulb being coupled to a different wire 51.

Information is entered into a register 60, by means of a plurality of wires 61 and a plurality of switches 63. The information contained in register 60 is indicated by a plurality of light bulbs 42. Light bulbs 42 may be energized by means of a battery 52, a diode 66, and the emitter collector circuit of a transistor 57, the limiting resistor 68 being connected to the base electrode of transistor 57 and to wire 61. Wire 65 is connected to register 60 and to the ground. A switch 64 is connected in series to wire 65. When switch 64 is closed, a negative clear pulse will be transmitted to the input of register 60, causing the output of register 60 to be cleared to all zeros.

The output of the register 50 is one of the inputs of adder 59: the second input to adder 59 comes from the register 60, and the third input to adder 59 is a wire 69, which is also connected to the positive terminal of battery 52. A switch 72 is connected to wire 69. When switch 72 is closed, a positive clock pulse will be transmitted to adder 59. At the instant the clock pulse is received by the adder 59, adder 59 will proceed to add the contents of register 50 to the contents of register 60. The output of adder 59 will be the sum of the numbers contained in register 50 and register 60. A plurality of wires 71 carry the sum output of the adder 59 to register 70 where the answer is stored, and this answer is displayed by means of a plurality of light bulbs 43. A switch 75 is connected in series to wire 74; wire 74 being connected to register 70 and to the ground. When switch 75 is closed, a negative clear pulse will be transmitted to wire 71 causing the output of register 70 to clear to zero, turning off any light bulb 43 which is illuminated. Thus an instructor, by means of manual control, can visually demonstrate to a student the processes a computer would employ to add two numbers.

Character 76 designates a plurality of coincidence gates. The first input to each of the coincidence gates 76, is the information contained in register 50, each coincidence gate 76 receives a different digit of information from register 50. The second input to each coincidence gate 76 is a wire 78 which is also connected to the positive terminal of battery 52. Switch 79 is connected in series to wire 78. Thus, when switch 79 is closed, a positive clock pulse will be transmitted to one input of each gate 76, enabling any of gates 76 having a first positive input. The output of each of the gates 76 are coupled to the input of register 60 via plurality of wires 82, a different wire 82 being coupled to each of plurality of wires 61 so that the numerical value of the information transferred to register 60 has the same numerical value as the information contained in register 50. This transfer of information from register 50 to register 60 is visually demonstrated to the class by having light bulbs 41 automatically turn off, and certain selected light bulbs 42 representing the same numerical value as extinguished light bulbs 41 automatically turn on.

It would be beneficial to an instructor if information could be entered into registers 50 and 60 automatically. The automatic entering of information into registers 50 and 60 may be accomplished by means of an information-conduction plate whose construction and operation is described in FIG. 5. Character 83 represents a plurality of exposed electrical terminals which are connected to every wire 51 and 61, one terminal being connected to one wire, terminals 83 being connected closer in distance to the inputs of registers 50 and 60 than switches 53 and 63. A plurality of wires 85 are connected from terminals 83 to the positive terminal of battery 52, one wire being connected from each terminal to the battery 52. Exposed contact 84 is connected to ground, and is also colinear to terminals 83. Thus, if an electrical conductor in the form of an information-conduction plate is placed in contact with said exposed electrical contact 84 and any of said terminals 83, the light bulbs connected to said terminals 83 will be energized by battery 52. Hence, by placing an information-conduction plate in electrical contact with the input terminals 83 and conductor 84 of either register 50 or register 60 information can automatically be entered into the respective registers.

The inputs of register 90 are a plurality of wires 91 which are connected to register 90 in parallel. A plurality of switches 93 are individually connected to wires 91, which are connected to the positive terminal of battery 52. Thus, for each switch 93 which is closed there will be a positive pulse representing a one for that particular digit going to the input of register 90. A switch 102 is connected in series to wire 101, wire 101 being connected to register 90 and to the ground. When switch 102 is closed, a negative clear pulse will be transmitted to the input of register 90 causing the output of register 90 to be zero. A plurality of electrical terminals 94 are connected to wires 91, terminals 94 being connected closer in distance to the inputs of register 90 than switches 93. A plurality of wires 96 are connected from terminals 94 to the positive terminal of battery 52, one wire being connected from each terminal to the battery 52. Exposed contact 95 is connected to ground, and is also colinear to terminals 94. Thus, information may be entered into register 90 in the same manner that information was entered into register 50 and register 60 by means of switches and/or by the use of an information-conduction plate.

The information contained in register 90 is indicated by a plurality of light bulbs 44. Light bulb 44 may be energized by means of battery 52, a diode 97, and the emitter collector circuit of a transistor 98, the limiting resistor 119 being connected to the base electrode of transistor 98 and wire 91.

The first input to adder 99 is the output of register 90; the second input to adder 99 comes from the register 100 by means of wires 111; the third input to adder 99 is a wire 105, which is also connected to the positive terminal of battery 52. A switch 106 is connected to wire 105. When switch 106 is closed, a positive clock pulse will be transmitted to adder 99. At the instant the clock pulse is received by the adder 99, adder 99 will proceed to add the contents of register 90 to the contents of register 100. The output of adder 99 will be the sum of the numbers contained in register 90 and register 100. In order to display the answer, to the addition, of the contents of register 90, to the contents of register 100, the output of adder 99 is coupled to register 120 where the answer to the addition is stored, and displayed by means of light bulbs 45. Light bulbs 45 are energized in the same manner as all other light bulbs used in this system. A switch 117 is connected in series to wire 115, wire 115 being connected to register 120, and to ground. When switch 117 is closed, a negative clear pulse will clear register 120. The contents of register 100 may be cleared by closing switch 125. Switch 125, is connected in series to wire 124, wire 124 being connected to ground. Hence, when switches 125 and 112 are closed a negative pulse will be on wires 111 and light bulbs 45 will be extinguished.

Since the output of adder 99 is the input of register 100, the apparatus of this invention may be used to demonstrate the procedure that a computer would employ to solve a multiplication problem. The multiplicand is entered into register 90 by means of switches 93 or by positioning a pre-coded information-conduction plate across terminals 94 and contact 95. The numerical value of the information contained in register 90, is displayed by means of light bulbs 44, and the numerical value of the output of adder 99 is displayed by means of light bulbs 45. By depressing switch 106 the contents of register 90, is automatically added to the contents of register 100. The number of times the contents of register 90 are added to the contents of register 100, would represent the multiplier. Thus, the instructor by use of switches 93, 117, 125, 102, 105 and an information-conduction plate may demonstrate to a class the operations that a computer may perform to solve a multiplication problem.

Figure 5:
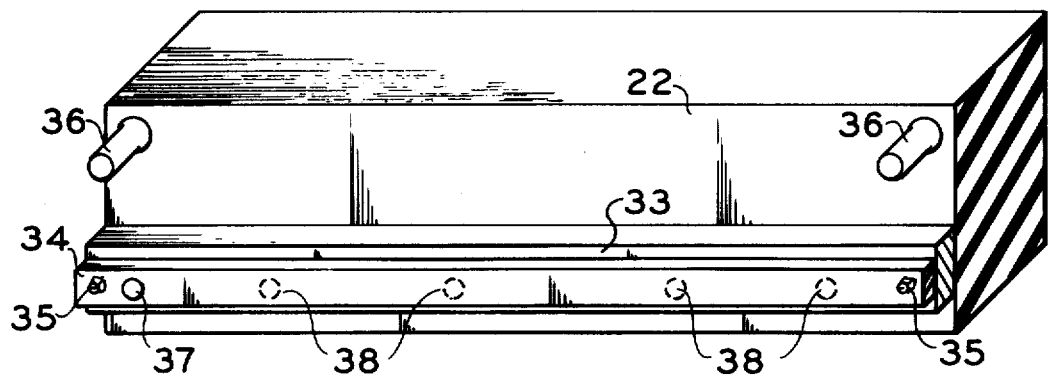
FIG. 5 is a perspective diagram partially in section of an instruction-conduction plate which may be used to enter information into the apparatus of this invention.

FIG. 5 is a perspective diagram of an information-conduction plate 22 partially in section form which may be used to enter information into the apparatus of this invention. Character 33 represents a conductor of electricity, an insulator 34 is placed over conductor 33, the insulator 34, and conductor 33 are fastened to plate 22 by a ferro-magnetic material such as nuts and bolts 35. Character 36 represents a ferro-magnetic material such as nuts and bolts which are mounted on plate 22 so that when magnets 120 on surface 6 attract materials 35 and 36, plate 22 is removably attached to sheet 6 with the conductor 33 in electrical contact with terminals 94 and contact 95. A hole 37, is punched in insulator 34, to ensure that a portion of conductor 33 will be in electrical contact with contact 95 when plate 22 is attached to sheet 6. Character 38 represents a plurality of partially prepunched holes in insulator 34, so positioned that holes 38 will be in direct alignment with terminals 94 when information-conduction plate 22 is attached to material 6. Said plurality of holes 38 are partially prepunched so that a hole can be easily formed by punching out the partially prepunched hole without the need for special tools.

The above specification described a new and improved system for simulating various computer operations, and for displaying digital information and computer programmed information to a group of people. It is realized that the above description may indicate to those skilled in the art additional ways in which the principles of this invention may be used without departing from its spirit. It is, therefore, intended that this invention be limited only by the scope of the appended claims.

What is claimed is:

1. A classroom training and display system under the control of an instructor for displaying digital information and for simulating some digital computer operations; said system comprising:
   a. a plurality of first registers for storing digital information;
   b. manually controlled means coupled to said plurality of first registers for an instructor to write one or more bits of digital information into each of said first registers;
   c. a first adder coupled to said first registers;
   d. timing means coupled to said first adder and said first registers for the instructor to control the time in which said adder adds and thus determines the value of the bits stored in said first registers;
   e. a second register coupled to said first adder for storing the digital information contained in said first adder;
   f. means coupled to said first registers and said second register for simultaneously displaying each bit of digital information stored in said first registers and said second register to a group of students at the same time;
   g. means coupled to said system for connecting said system to a source of electric power to demonstrate to a group of students various computer operations; and means for multiplying digital information wherein said multiplying means comprises a second adder for adding digital information; a third register coupled to said means to write, said display means, and the input of said second adder, for storing digital information; a fourth register coupled to the inputs of said second adder; a fifth register coupled to said display means, the input of said fourth register and the output of said second adder for storing the digital information contained in said third register and said fourth register; and switching means coupled to said fourth register and said fifth register for transferring the contents of said fourth register so that the amount of times said switching means are used will represent the number of times the digital information contained in said third register was multiplied enabling a student to see the numerical steps via said display system.

2. The system defined in claim 1 wherein the means for displaying comprises a plurality of illuminating devices which will be visible to an observer when said illuminating devices are enabled, said illuminating devices being enabled when information is present.

3. The system defined in claim 2 wherein said illuminating devices are light bulbs.

4. The system defined in claim 1 further including means for transmitting information among said first registers comprising:
 a. a plurality of gates;
 b. a plurality of first wires connected to the output of one of said first registers and to first inputs of said gates;
 c. a plurality of second wires connected from the outputs of said gates to the inputs of another of said first registers;
 d. a first switch;
 e. a plurality of third wires connected to second inputs of said gates, said third wires also being connected to said first switch, so that when said first switch is depressed information is transferred from one of said first registers to another of said first registers.

5. The system defined in claim 1 wherein said time control means comprises:
 a. a fourth wire which is connected to said first adder, and to said source of electric power;
 b. a second switch connected in series to said fourth wire, so that when said second switch is depressed said first adder will add two or more numbers.

6. The system defined in claim 1 wherein the means for writing information comprises a plurality of third switches coupled to said source of electric power and to said first registers so that when said third switches are depressed information is entered into said first registers.

7. The system defined in claim 1 further including means coupled to said first register, said second register, said third rigister, said fourth register and said fifth register for clearing all of said registers contained in said system.

* * * * *